United States Patent [19]

Hollins et al.

[11] Patent Number: 5,060,231
[45] Date of Patent: Oct. 22, 1991

[54] LASER SYSTEM

[75] Inventors: Richard C. Hollins; David L. Jordan, both of Worcester, England

[73] Assignee: The Secretary of State for Defence in Her Britannic Majesty's Government of the United Kingdom of Great Britain and Northern Ireland, London, England

[21] Appl. No.: 359,649

[22] Filed: May 31, 1989

Related U.S. Application Data

[63] Continuation of PCT/G87/00881, Dec. 4, 1987.

[30] Foreign Application Priority Data

Dec. 22, 1986 [GB] United Kingdom ............... 8630603

[51] Int. Cl.$^5$ ..................... H01S 3/091; H01S 3/092
[52] U.S. Cl. ......................................... 372/71; 372/99
[58] Field of Search ...................................... 372/71, 99

[56] References Cited

U.S. PATENT DOCUMENTS

| 3,679,995 | 7/1972 | Sorokin | 372/71 |
| 3,810,042 | 5/1974 | Chang et al. | 372/71 |
| 3,949,319 | 4/1976 | Tofield et al. | 372/71 |
| 4,284,962 | 8/1981 | Esterowitz et al. | 372/71 |
| 4,405,230 | 9/1983 | Tew et al. | 372/71 |

OTHER PUBLICATIONS

"Optics Communications", vol. 58, No. 4, pp. 265-268, R. C. Hollins, D. L. Jordan; Jun. 1986.

Applied Physics B. Photophysics and Laser Chemistry, vol. B33, No. 2, Feb. 1984, Springer-Verlag, (Heidelberg, DE), pp. 95-98.

Applied Physics Letters, vol. 36, No. 8, Apr. 15, 1980, American Institute of Physics, (New York, U.S.), T. J. Pacala et al., pp. 620-623.

Primary Examiner—William L. Sikes
Assistant Examiner—Robert E. Wise
Attorney, Agent, or Firm—Nixon & Vanderhye

[57] ABSTRACT

A laser system includes a first laser (66) and a second laser (68) optically coupled to the first laser (66), characterized in that the first laser (66) is arranged to respond to pumping by producing a first laser output and retaining for a time period a net gain for second laser output radiation, and the second laser (68) is adapted to be pumped by the first laser output and to respond within the time period by producing a second laser output optically coupled to the first laser (66) to effect injection control thereof. The first laser (66) may be an excimer laser and the second laser (68) may be a dye laser. The lasers may be coupled by a common laser mirror (20).

21 Claims, 5 Drawing Sheets

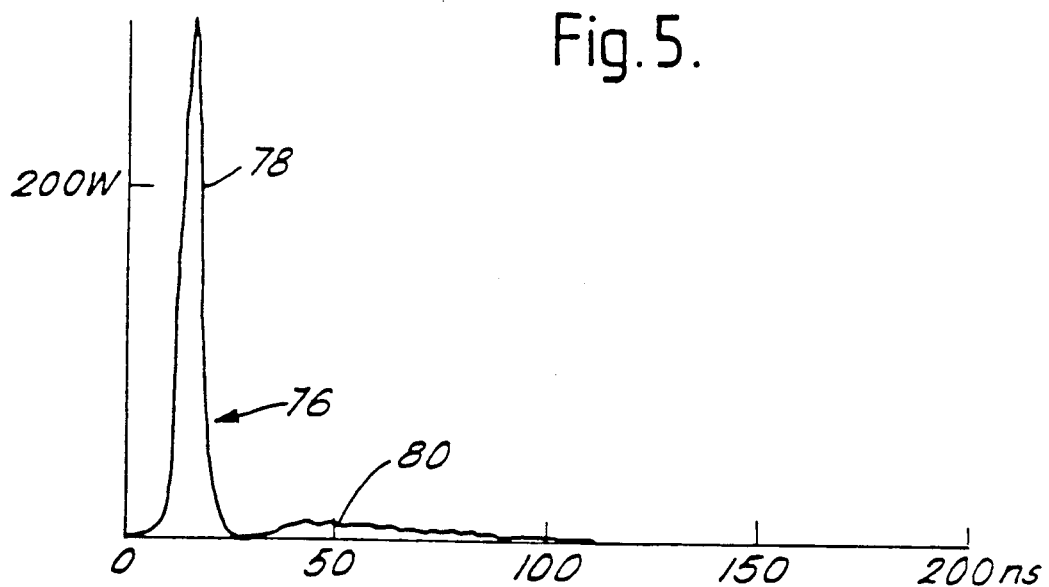
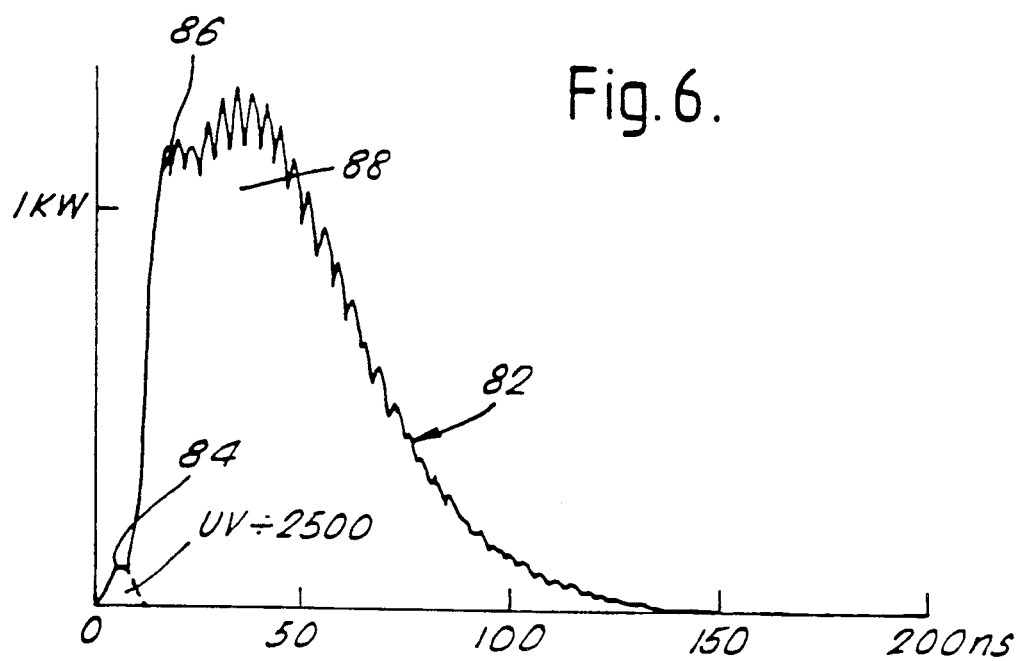

LASER SYSTEM

This application is a continuation application under 35 USC 363 of PCT/GB87/00881 filed Dec. 4, 1987.

BACKGROUND OF THE INVENTION

1. Field of the Invention

This invention relates to a laser system, and particularly to an injection controlled laser system.

2. Discussion of Prior Art

In laser systems utilising broadband laser transitions or having unstable resonators, competition between different modes results in the laser power being spread over a number of modes. Examples of such laser systems are the $CO_2$ and excimer lasers. These laser systems also exhibit net optical gain or amplifying properties for a gain period of a comparatively short duration. In particular, excimer lasers exhibit a relatively weak optical gain compared with other lasers. Much of the optical gain period may be devoted to amplifying weak spontaneous emission, which provides correspondingly weak laser output power. It is accordingly advantageous to provide amplification of desirable laser modes.

One known control technique involves injecting a pulse of laser radiation into the laser cavity. This technique provides the laser cavity with a starting flux of an intensity similar to the strong laser modes. Such a flux reduces the time necessary to establish a powerful laser field and a considerable increase in laser output power is achieved. Pulse injection also provides inter alia control of the laser output frequency. Examples of the utilisation of such a mechanism can be found in Applied Physics letters 36(8) pp 617-622, (15 April 1980) and in Applied Physics 23 pp 245-251 (1980).

Injection control is suited to laser systems whose media exhibit net gain for only a short duration, such as the $CO_2$ and excimer lasers. However, this short duration of net gain produces timing problems. The injected pulse must appear when the laser medium is exhibiting net gain, i.e. in a certain 'time window'. Prior art laser systems incorporating two lasers require complex activation mechanisms for the pumping systems to synchronise laser action. In practice, the two lasers are difficult to synchronise. Furthermore, separate laser systems are required, each involving a respective laser cavity, pumping and activation devices.

SUMMARY OF THE INVENTION

The object of this invention is to provide a laser system of simplified construction which is injection controlled, but which needs only one activation mechanism and in which pumping activation synchronisation means are accordingly unnecessary.

The present invention provides a laser system including a first laser and a second laser optically coupled to the first laser, and wherein:

(1) the first laser is arranged to respond to pumping by producing a first laser output and retaining for a time period a net gain for second laser output radiation; and (2) the second laser is adapted to be pumped by the first laser output and to respond within the said time period by producing a second laser output optically coupled to the first laser to effect injection control thereof.

The invention provides the advantage that it is only necessary to activate pumping of the first laser; the second laser responds automatically without requiring independent pumping or activation means and consequent need for synchronisation.

In the laser system of the invention, the first laser has first and second laser transitions which provide the first laser output and the net gain for the second laser output respectively, the first laser output having a shorter wavelength than the second laser output. The first laser may be a XeF excimer laser.

The second laser may be a dye laser, and may be tunable. A suitable tuning means comprises a removable dye cell to enable use of different dyes with difference response frequencies.

Optical coupling between the first and second lasers may be achieved by the lasers having a common laser cavity mirror. The first laser pulse may be converged by a convex lens on to the dye cell.

BRIEF DESCRIPTION OF THE DRAWINGS

In order that the invention might be more fully understood, one embodiment thereof will be described, by way of example only, with reference to the accompanying drawings, in which:

FIG. 5 is a temporal profile of XeF laser output without injection control;

FIG. 6 is a temporal profile of XeF laser output with injection control;

DETAILED DESCRIPTION OF PREFERRED EMBODIMENTS

Figure 1:
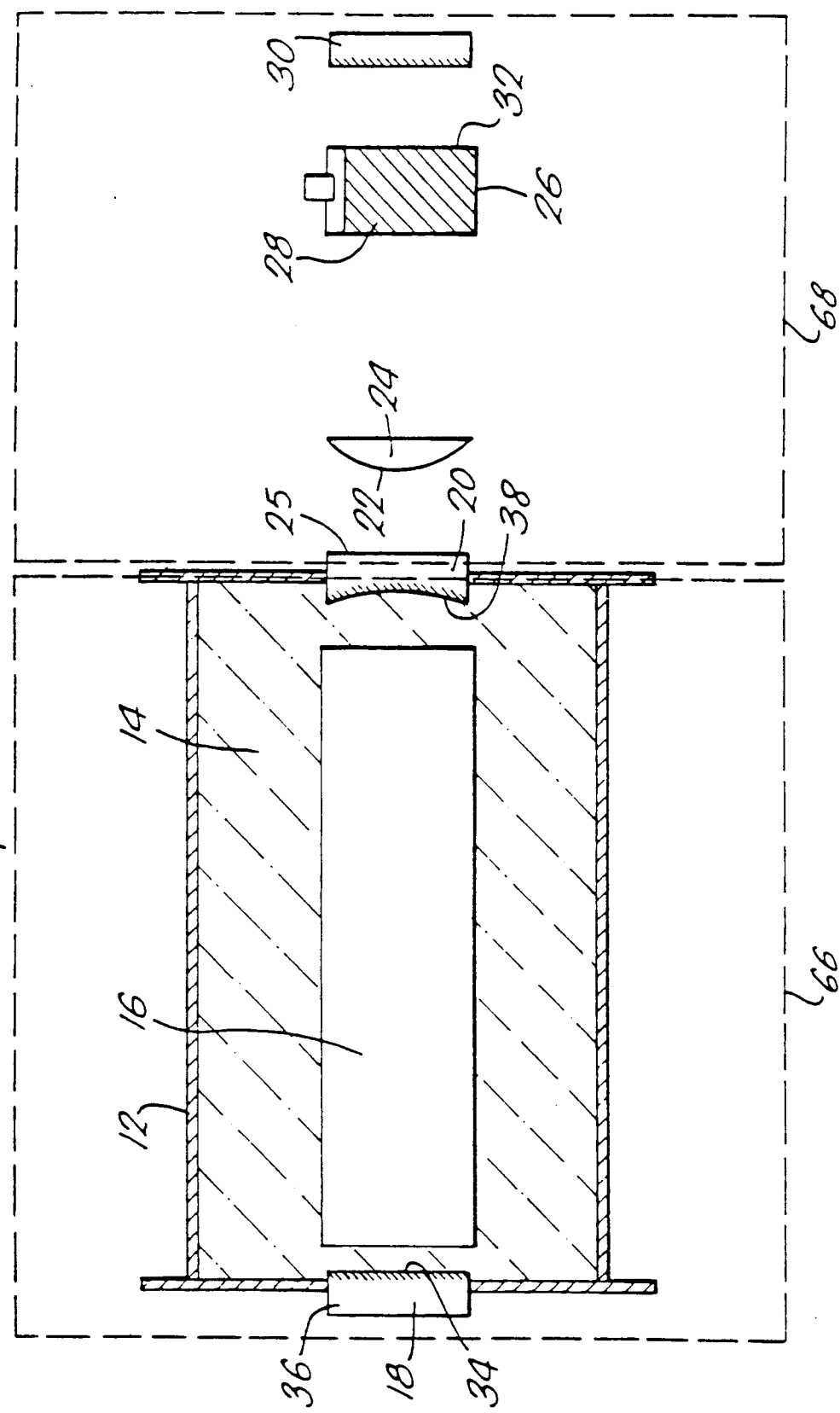
FIG. 1 is a sectional drawing of an injection controlled laser system of the invention.

Referring to FIG. 1, there is schematically shown a laser system 10 of the invention. The system 10 comprises a nickel coated stainless steel tube containing a gas mixture 14. The gas mixture 14 consists of Helium, Xenon and Nitrogen trifluoride with respective partial pressures of 3 bar, 10 mbar and 3 mbar. The tube 12 has an internal diameter of 10 cm, is 550 mm long, and is capable of withstanding pressures of up to 10 bar. A discharge device 16 is placed in the centre of tube 12 and will be described in more detail later. A plane mirror 18 and a concave mirror 20 in adjustable mounts (not shown) are sealed to respective ends of the tube 12. The concave mirror 20 has a radius of curvature of 100 mm. The adjustable mounts allow mirror alignment, and each consists of an O-ring seal and a mirror clamp. Mirror movement perpendicular to the O-ring axis allows pre-clamping alignment.

A convex face 22 of a 100 mm focal length plano-convex silica lens 24 is arranged immediately adjacent to an external plane face 25 of the mirror 20. The lens 24 has a focal point (not shown) within a fused silica cell 26, the cell being 4 cm in height and having a 1 cm square cross section. The cell 26 contains a dye 28, such as Coumarin 102, a laser-grade dye supplied by Edinburgh Instruments, a British company. A plane mirror 30 is arranged immediately adjacent to a side 32 of the cell 26.

The mirror 18 has internal and external faces 34 and 36 which are coated for maximum transmission of radiation at a wavelength of 351 nm. The internal face 34 is also coated to produce a reflectivity of 0.90 for 485 nm wavelength radiation. The concave mirror 20 is similarly coated for maximum transission of 351 nm radiation, but has an additional coating on an internal face 38 to provide a reflectivity of 0.985 for 485 nm wavelength radiation. Furthermore, the external face 25 is coated to inhibit reflection of 485 nm wavelength radiation. Transmissive and reflective coatings for optical components are well known and will not be described.

The mirrors 18, 20 and 30 are aligned to be coaxial with the tube 12. Alignment is achieved by using another laser having an output beam to which all mirror coatings are transparent. The beam is directed along the axis of tube 12, and mirrors 18, 20 and 30 are aligned with this beam in a known manner.

Figure 2:
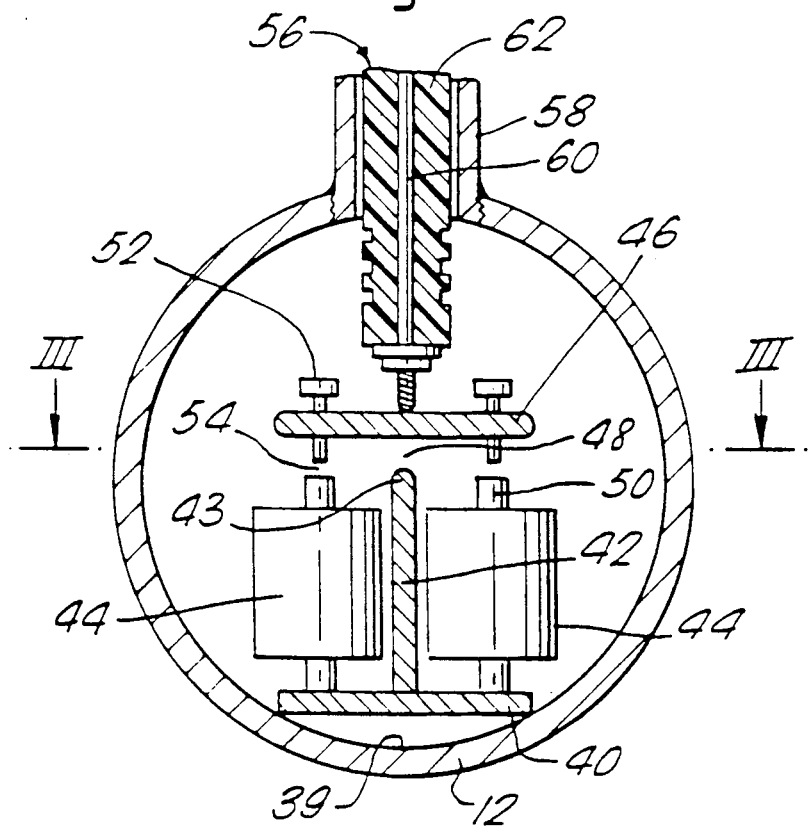
FIG. 2 is a sectional view of a XeF laser incorporated in the FIG. 1 laser system.

Referring now also to FIG. 2, in which parts previously described are like referenced, the tube 12 is schematically shown in cross section. The tube 12 has an inner surface 39, and is in electrical contact with horizontal and vertical electrodes 40 and 42. The electrode 42 extends upwardly from the electrode 40, the latter being arranged against the tube inner surface 39. Both electrodes are 6 mm thick, 51 mm wide and 360 mm long. In combination they form an inverted T, and electrode 42 has a semicircular edge 43 uppermost.

Two rows of fifteen 26 nF barium titanate capacitors 44 (of which two are shown) are connected to the horizontal electrode 40, either side of the upright electrode 42. A nickel electrode 46 lies horizontally above the capacitors 44 and has the same dimensions as the electrode 40. The dimensions of the electrodes 42 and 46 define a discharge volume 48. The volume 48 is 6 mm high, 2 mm wide and 360 mm long. The capacitors 44 have terminals 50 and the electrode 46 has terminals 52. The terminals 50 and 52 are spaced apart by a preionisation gap 54, 0.7 mm in width. Electrodes 40, 42 and 46 form the discharge device 16 shown in FIG. 1.

Three transverse coaxial feedthroughs 56 are situated in parallel along the top of tube 12, and are connected to an external voltage supply (not shown). The feedthroughs 56 have external conductors 58 which are earthed and in electrical contact with the tube 12. The external voltage is connected to the electrode 46 through a central conductor 60 of each of the feedthroughs 56, the conductors 60 being insulated from respective external conductors 58 by PTFE insulation 62.

Figure 3:
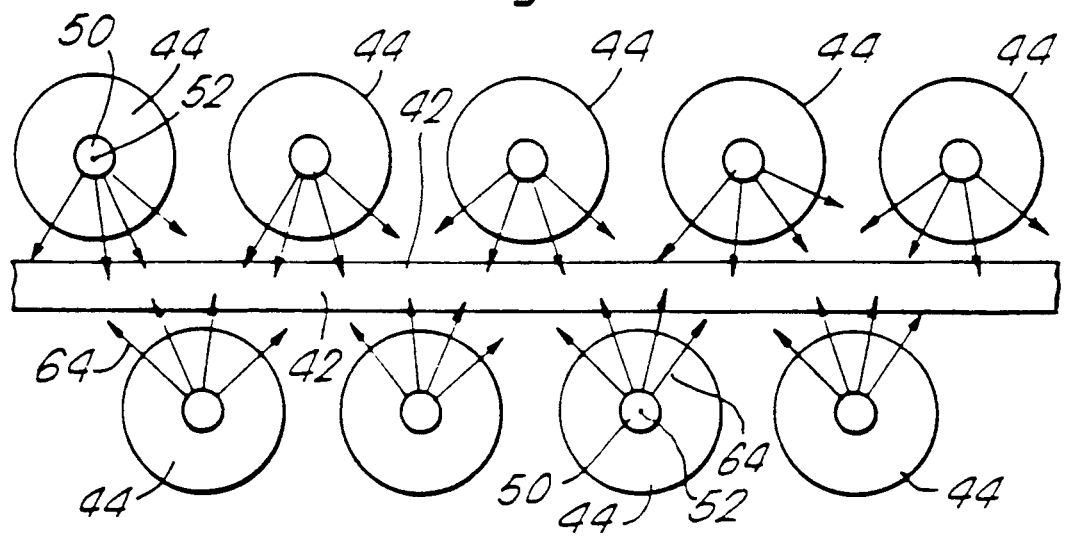
FIG. 3 is a sectional view along lines III—III in FIG. 2, and shows an assembly of capacitors incorporated in the FIG. 1 laser.

Referring now also to FIG. 3, there is schematically shown a section on lines III—III in FIG. 2 looking in the direction of the arrows. Parts previously described are like referenced. The capacitors 44 (of which nine are shown) are arranged on either side of the upright electrode 42, and the two rows are transversely offset from one another by half a capacitor centre spacing.

The tube 12, gas 14, discharge device 16 and mirrors 18 and 20 in combination form an XeF excimer laser indicated generally by 66 in FIG. 1, and described in more detail in Optics Communications vol. 58, No. 4, p 265 (15 June 1986). In addition mirrors 20 and 30, lens 24, and dye cell 26 form a dye laser indicated generally by 68.

The laser system 10 of the invention operates as follows. A voltage pulse is obtained by discharging an external 30 kV, 20 nF storage capacitor (not shown). The voltage pulse passes through a spark gap (not shown) to each of the coaxial feedthroughs 56 and thence to electrode 46 and terminals 52. This establishes an electric field across terminals 50 and 52 which charges the capacitors 44. When the voltage across capacitors 44 rises above the breakdown voltage of the gas 14, sparks are produced in the gaps 54 generating ultraviolet radiation indicated by arrows 64.

The ultraviolet radiation 64 irradiates and preionises the discharge volume 48. The capacitors 44 are positioned sufficiently close to one another and to electrode 42 to achieve a maximum, longitudinally uniform, preionisation density in the discharge volume 48. Under the action of external voltage across electrodes 42 and 46, the preionisation establishes a glow discharge in the volume 48.

The glow discharge creates excited Xe atoms denoted by Xe*. Fluorine atoms, arising from the NF$_3$ component of the gas 14, combine with the Xe* atoms to produce Xe*F molecules. These molecules decay to produce radiation with a wavelength depending on the molecular states of the excited molecule and the decay product.

Figure 4:
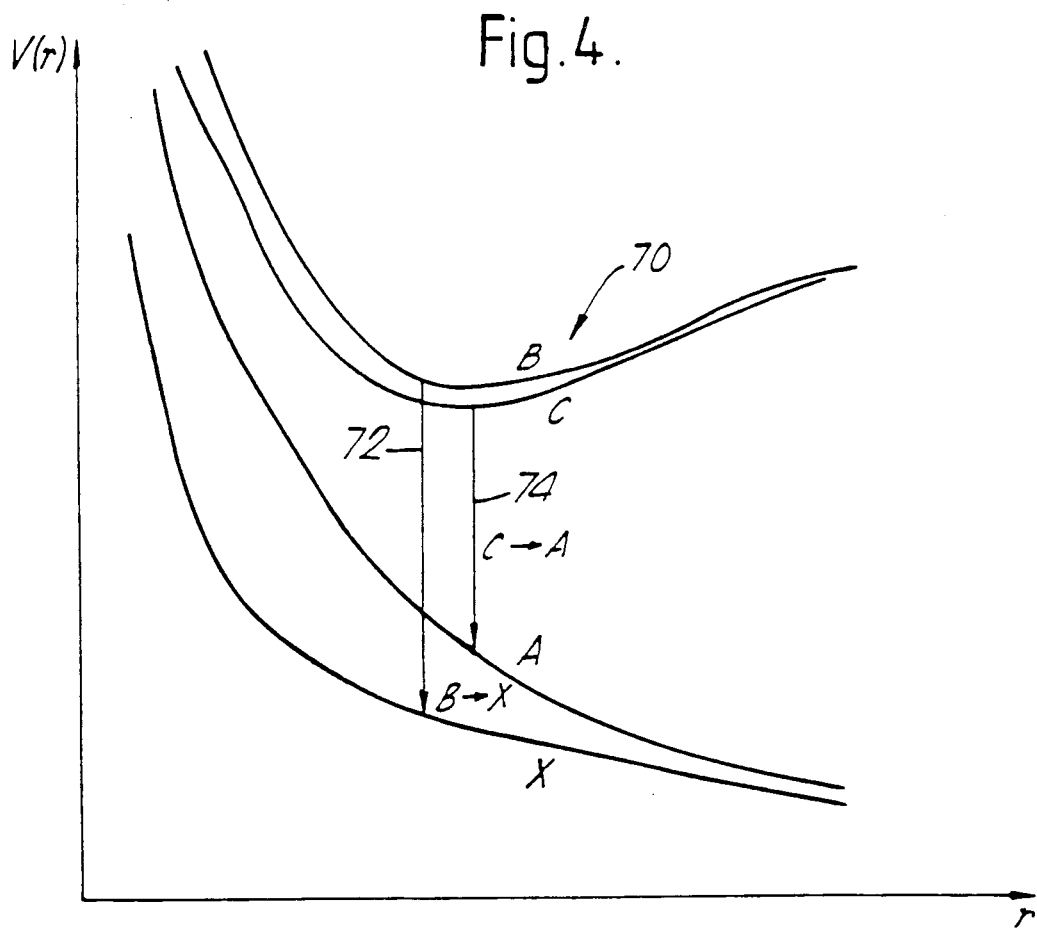
FIG. 4 is a graph showing bonding energy versus internuclear distance for XeF molecules in various molecular states.

Referring now to FIG. 4, there is shown a graph 70 of bonding energy versus internuclear distance with arbitrary units for both axes. The graph shows bonding energy curves for molecules in various molecular energy states, and are labelled with characters conventional in molecular spectroscopy. Two laser transitions 72 and 74 are shown, these being the B→X and C→A transitions. The B→X and C→A transitions produce radiation with wavelength ranges of 351 nm–353 nm and 440 nm–520 nm respectively.

Referring now to FIG. 5, there is shown a graph 76 of output power (Watts) versus time (nanoseconds) for output radiation from the XeF laser 66 when isolated from the dye laser 68. The origin of the graph 76 indicates the time of discharge of the device 16. The graph 76 has a peak 78 in excess of 200 W indicating ultraviolet radiation power produced by the B→X transition.

The peak 78 arises from amplification of spontaneous emission due to the B→X transition, and takes the form of a pulse of energy in the range 1 mJ to 3 mJ of duration typically 5 ns. After ultraviolet radiation is emitted from both ends of the tube 12, the gas remains in an excited state, but with a reduced potential energy. A weak laser pulse represented by peak 80 in FIG. 5 begins to develop 15 ns after the ultraviolet pulse. The weak laser pulse arises from amplification of stimulated emission from the blue/green C→A transition. It reaches a maximum of 30 watts in 40 ns after the initial ultraviolet pulse.

The intensity of the blue/green pulse is sensitive to the gas potential energy after the ultraviolet pulse. If the ultraviolet pulse is allowed to resonate in the excimer laser cavity, then the intensity of the blue/green pulse reduces. The blue/green intensity may be maximised by maximising the transparency of the mirrors 18 and 20 for ultraviolet radiation.

In the laser system 10, the lens 24 focusses the ultraviolet radiation from the excimer laser 66 into the dye 28 of cell 26. The dye 28 has an absorption wavelength within the bandwidth of the B→X transition, and is therefore excited by the ultraviolet radiation. The dye 28 responds by producing a laser output having a wavelength within the bandwidth of the C→A transition. The coating on the mirrors 20 and 30 provide high reflectivities for this radiation, and together with the lens 24, a stable laser cavity is formed. It is possible to obtain optimum performance of the dye laser 68 by adjusting the intracavity distance between mirrors 20 and 30. The position of lens 24 has also to be adjusted to maintain the ultraviolet flux density within dye 28.

The dye laser 68 produces a laser pulse having a duration of about 7 ns, which is delayed by about 5 ns with respect to the ultraviolet pulse. The mirror 20 has a transmission coefficient of 0.005 for radiation with a wavelength of 485 nm and weakly couples the dye laser radiation to the XeF laser cavity. The dye laser radiation has a wavelength within the bandwidth of the C→A transition and effects injection control of the XeF laser 66 as discussed earlier. The timing of the injected pulse is intrinsically controlled by the response time of the dye 28.

Referring now to FIG. 6, there is shown a graph 82 of output power (Watts) versus time (nanoseconds) for the laser system 10, i.e. the combination of excimer laser 66 and dye laser 68. A peak 84 corresponds to the ultraviolet pulse and is scaled down by a factor of 2500 as compared to the rest of the graph 82. Another peak 86 corresponds to initial injection of radiation from the dye laser 68. A modulated peak 88 shows the output of the laser 10 due to the C→A transition.

Comparison of peaks 80 and 88 in FIGS. 5 and 6 respectively shows that injection control increases the blue/green radiation power by a factor of about 100. A typical pulse energy of 0.5 mJ is produced from an estimated 10 μJ of injected energy.

The peak 88 is modulated due to the round trip frequency of the radiation in the XeF laser cavity as a consequence of the short duration of the injected pulse.

The output of laser 10 may be tuned to another wavelength by changing the dye 28 in dye cell 26. The dye laser absorption frequency must be within the bandwidth of the B→X transition and its response frequency must be within the bandwidth of the C→A transition. For example coumarin 102, coumarin 307 and a mixture of the two have respective maximum laser wavelengths of 477 nm, 506 nm and 490 nm. These dyes are available from Edinburgh Instruments.

Figure 7:
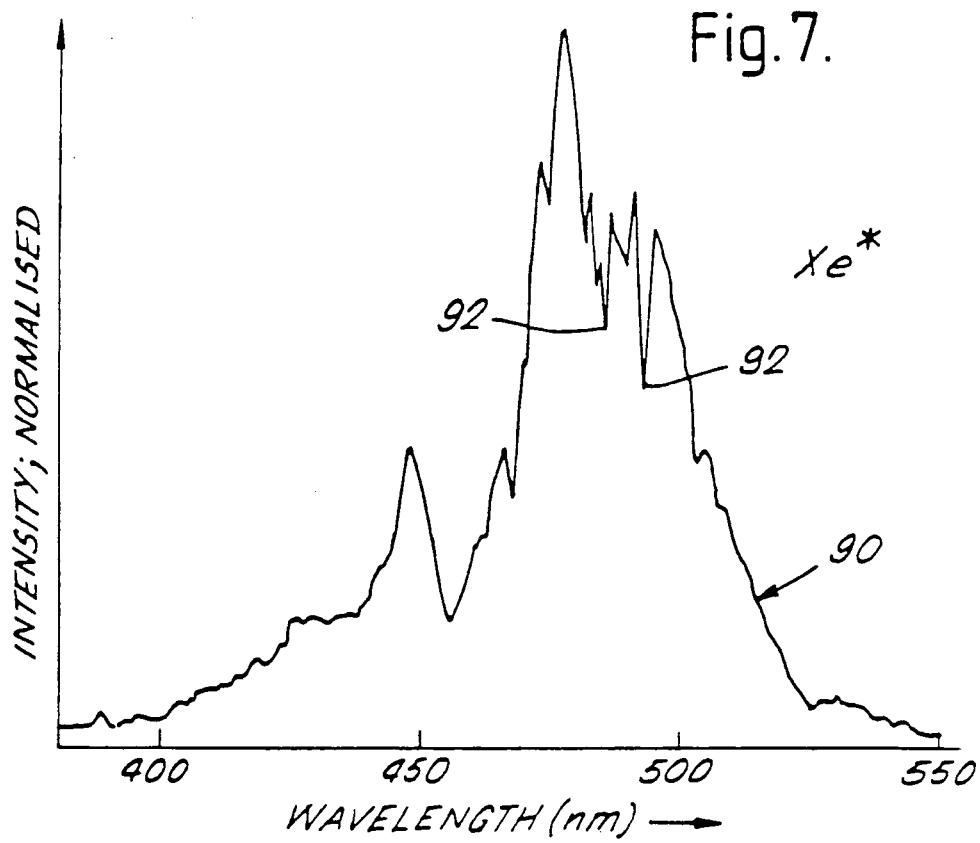
FIG. 7 is a spectral profile of a C→A transition of a XeF laser.
Figure 8:
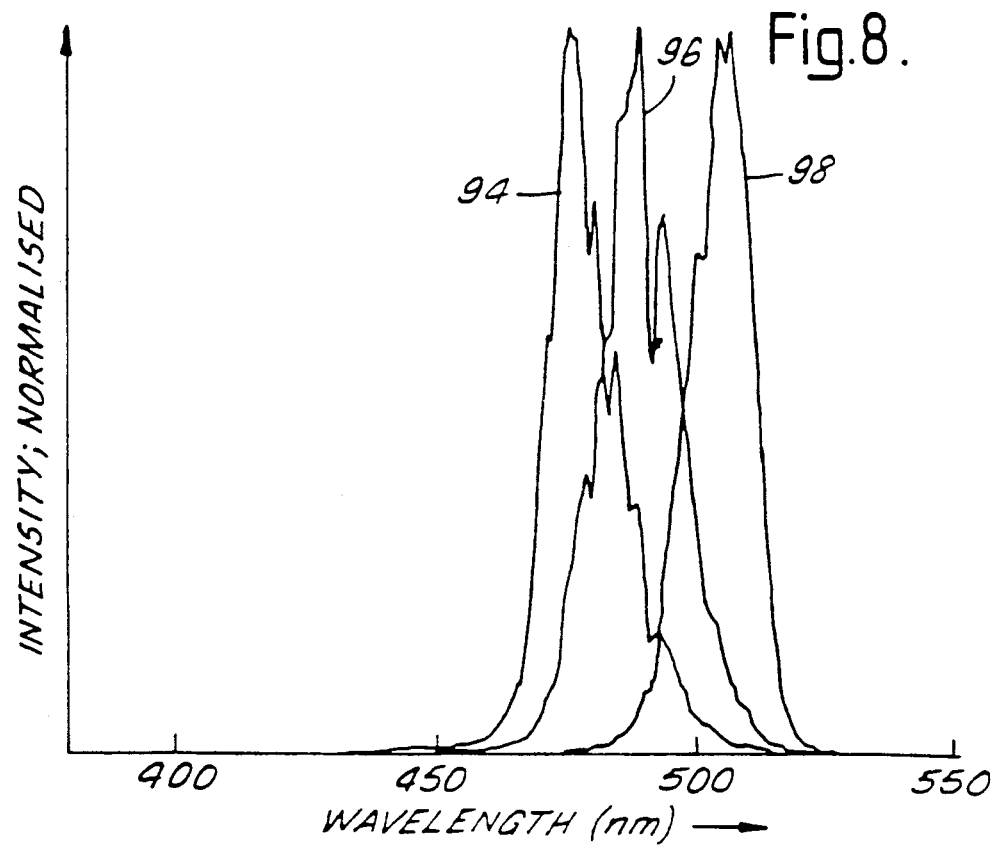
FIG. 8 shows spectral profiles of emission from three examples of laser dyes.

Referring to FIG. 7, there is shown a spectrum 90 of the radiation emitted from the C→A transition. The emission spectrum 90 is crossed by absorption lines such as 92 arising from excited Xe atoms. Referring also to FIG. 8, there are shown spectra 94, 96 and 98 of the laser output from the laser 68 when containing successively the dyes coumarin 102, coumarin 307 and a mixture of these respectively. The laser 10 will operate with best efficiency when the spectral peak of the dye laser emission does not coincide with an absorption line 92. Another tuning element such as a diffraction grating (not shown) may replace plane mirror 30 to achieve a finer or wider tuning band. Such tuning arrangements are known in the art of dye lasers.

It is possible to use a different laser medium in place of the gas 14 so long as that medium has at least two laser transitions, one of which is of a suitably short wavelength to excite a dye which produces radiation of longer wavelength in the bandwidth of one of the other laser transitions of the medium. It is also possible to replace the dye laser with another laser which is capable of operating in a similar fashion.

The mirror 20 and lens 24 may be integrated into one optical element performing their combined functions.

Figure 9:
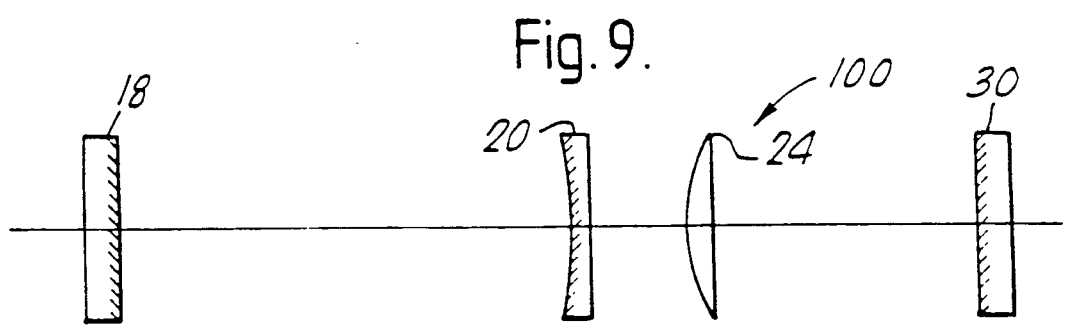
FIG. 9 shows the optical arrangement of the FIG. 1 laser.
Figure 10:
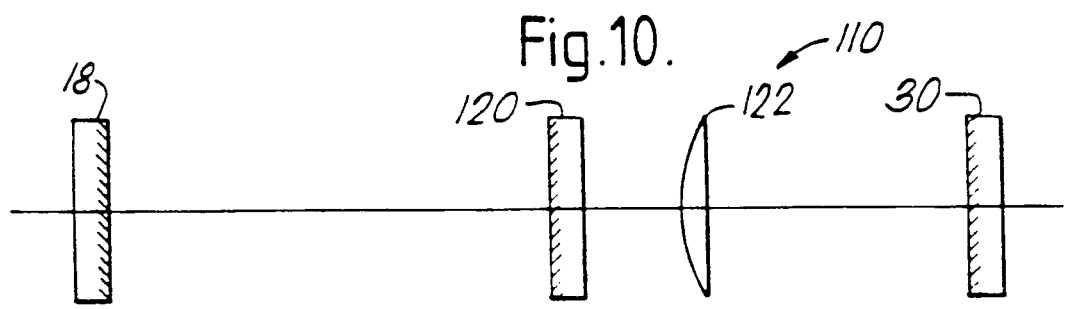
FIG. 10 shows an alternative optical arrangement for the FIG. 1 laser system.

The laser 10 may incorporate alternative optical components, which will now be described with reference to FIGS. 9 and 10. FIG. 9 schematically shows once more the refracting and reflecting optical components employed in the laser system 10 of FIG. 1. These are indicated generally by 100. FIG. 10 shows an alternative embodiment 110, in which parts similar to those of FIG. 9 have been like referenced. In this drawing, a plane mirror 120 and a silica lens 122 replace mirror 20 and lens 24 of FIG. 9. The coatings on the plane mirror 120 are similar to the coatings on mirror 20. Although lens 24 corrects for the divergence of mirror 20, since the mirror 120 is plane no corresponding function is required of lens 122. Therefore, lens 122 has a longer focal length than lens 24. The optical system 110 is more suitable for embodiments of the invention having larger output powers than the laser system 10.

We claim:

1. A laser system including a first laser and a second laser optically coupled to the first laser, said system comprising:
   (a) said first laser comprising means, including a lasing medium responsive to pumping, for producing a first laser output at a first wavelength and for retaining, for a time period, a net gain for radiation at a second wavelength, said second wavelength longer than said first wavelength; and
   (b) said second laser including a lasing medium responsive to pumping at said first wavelength by generating a second laser output at said second wavelength, said second laser further including means for returning said second laser output to said first laser and thereby effecting injection control of said first laser.

2. A laser system according to claim 1 wherein the first laser has a lasing medium with more than two laser transitions which transitions providing the first laser output and the net gain for radiation at the second wavelength.

3. A laser system according to claim 2 wherein the first laser is an excimer laser.

4. A laser system according to claim 3 wherein the excimer laser has a XeF laser medium.

5. A laser system according to claim 1 wherein the second laser is a dye laser.

6. A laser system according to claim 5 wherein the dye laser is tunable.

7. A laser system according to claim 5 wherein the dye laser includes interchangeable dye cells providing tunability.

8. A laser system according to claim 7 wherein the first laser output is converged to the dye cell.

9. A laser system according to claim 8 wherein the first laser output is converged by a convex lens.

10. A laser system according to claim 1 wherein the first and second lasers are optically coupled by a common laser mirror.

11. A laser system comprising:
   first laser means, responsive to excitation pumping, having a lasing medium with at least first and second laser transitions at different wavelengths, said first laser transition having a shorter wavelength than said second transition, said first laser transition comprising means for providing a first laser output and said second laser transition comprising means for providing a net gain for second laser output;

second laser means, responsive to radiation from said first laser transition, for providing an output having a wavelength capable of activating said second laser transition of said first laser means medium; and means for optically coupling said second laser output to said first laser means medium, and for effecting injection control of said first laser means.

12. A laser system according to claim 11, wherein said first laser means medium has more than two laser transitions and said first laser comprises an excimer laser.

13. A laser system according to claim 12, wherein said excimer laser has a XeF lasing medium.

14. A laser system according to claim 11, wherein said second laser comprises a dye laser.

15. A laser system according to claim 14, wherein said dye laser comprises a tunable dye laser.

16. A laser system according to claim 14, wherein said dye laser includes means permitting interchangeable dye cells having varied tunability.

17. A laser system according to claim 16, further including means for focusing said first laser output on said interchangeable dye cell of said dye laser.

18. A laser system according to claim 17, wherein said focusing means comprises a convex lens.

19. A laser system according to claim 11, wherein said means for optically coupling comprises a common laser mirror.

20. A laser system comprising:
a first laser, having a lasing medium, for emitting energy at a first wavelength and responsive to radiation at a second wavelength, said second wavelength longer than said first wavelength;

a second laser, having a lasing medium, responsive to radiation at said first wavelength from said first laser for providing an output at said second wavelength; and an optical device for coupling radiation at said first wavelength from said first laser to said second laser and for coupling radiation at said second wavelength to said first laser thereby effecting injection control of said first laser.

21. The laser system according to claim 20 wherein said first laser medium has more than two laser transitions and one of said transitions provides said first wavelength output and a second transition provides a net gain for radiation at said second wavelength.

* * * * *